US008436827B1

(12) United States Patent
Zhai et al.

(10) Patent No.: US 8,436,827 B1
(45) Date of Patent: May 7, 2013

(54) DISAMBIGUATING TOUCH-INPUT BASED ON VARIATION IN CHARACTERISTIC SUCH AS SPEED OR PRESSURE ALONG A TOUCH-TRAIL

(75) Inventors: Shumin Zhai, Mountain View, CA (US); Lawrence Diao, Vienna, VA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/306,544

(22) Filed: Nov. 29, 2011

(51) Int. Cl.
*G06F 3/041* (2006.01)
*G06F 3/033* (2006.01)

(52) U.S. Cl.
USPC ........... 345/173; 715/863; 345/156; 345/174; 178/18.01; 178/18.05; 178/18.06

(58) Field of Classification Search .... 178/18.01–18.11, 178/19.01–19.07, 20.01–20.04; 345/168–170, 345/173–179, 156; 715/773, 863
See application file for complete search history.

(56) References Cited

U.S. PATENT DOCUMENTS

| | | | |
|---|---|---|---|
| 5,543,591 A | 8/1996 | Gillespie et al. | |
| 6,323,846 B1 * | 11/2001 | Westerman et al. | 345/173 |
| 7,133,031 B2 * | 11/2006 | Wang et al. | 345/173 |
| 7,453,439 B1 * | 11/2008 | Kushler et al. | 345/168 |
| 2002/0015024 A1 * | 2/2002 | Westerman et al. | 345/173 |
| 2003/0206162 A1 * | 11/2003 | Roberts | 345/173 |
| 2004/0140965 A1 * | 7/2004 | Wang et al. | 345/179 |
| 2005/0275633 A1 * | 12/2005 | Varanda | 345/173 |
| 2006/0066566 A1 * | 3/2006 | Law | 345/156 |
| 2008/0042985 A1 * | 2/2008 | Katsuhito et al. | 345/173 |
| 2008/0297475 A1 * | 12/2008 | Woolf et al. | 345/163 |
| 2008/0309630 A1 | 12/2008 | Weterman | |
| 2009/0158191 A1 * | 6/2009 | Varanda | 715/773 |
| 2009/0267904 A1 * | 10/2009 | Mak-Fan et al. | 345/173 |
| 2009/0278798 A1 * | 11/2009 | Kim et al. | 345/158 |
| 2009/0289905 A1 * | 11/2009 | Ahn | 345/173 |
| 2010/0085318 A1 * | 4/2010 | Lee et al. | 345/173 |
| 2010/0137031 A1 * | 6/2010 | Griffin et al. | 455/566 |
| 2010/0214235 A1 * | 8/2010 | Shmaya et al. | 345/173 |
| 2010/0295805 A1 * | 11/2010 | Shin et al. | 345/173 |
| 2010/0315366 A1 | 12/2010 | Lee et al. | |

(Continued)

FOREIGN PATENT DOCUMENTS

| | | |
|---|---|---|
| EP | 1 674977 | 6/2006 |
| EP | 2 112 579 | 10/2009 |

OTHER PUBLICATIONS

International Search Report and Written Opinion from International Application No. PCT/US2012/061658, dated Jan. 23, 2013.

*Primary Examiner* — Lun-Yi Lao
*Assistant Examiner* — Gene W Lee
(74) *Attorney, Agent, or Firm* — McDonnell Boehnen Hulbert & Berghoff LLP (57) ABSTRACT

Disclosed is a method and corresponding apparatus or system for disambiguating touch-input based on variation in a characteristic such as speed or pressure along a touch-trail. A computing system may detect a variation in a characteristic of a touch-trail, such as variation in speed of movement of touch along the touch-trail and/or a variation in pressure of touch along the touch-trail. Based on the detected variation, the computing system may determine an intended touch position represented by the trail, such as a landing position or lifting position for instance. And the computing system may take action based at least in part on that determined touch position.

20 Claims, 6 Drawing Sheets

U.S. PATENT DOCUMENTS

| | | |
|---|---|---|
| 2011/0037720 A1* | 2/2011 | Hirukawa et al. ............. 345/173 |
| 2011/0050588 A1 | 3/2011 | Li et al. |
| 2011/0063231 A1* | 3/2011 | Jakobs et al. ................. 345/173 |
| 2011/0109578 A1* | 5/2011 | Waller et al. ................. 345/173 |
| 2011/0310048 A1* | 12/2011 | B.R et al. ...................... 345/173 |
| 2011/0310049 A1* | 12/2011 | Homma et al. ................ 345/173 |
| 2011/0314374 A1* | 12/2011 | Chae ............................. 715/702 |
| 2012/0044175 A1* | 2/2012 | Cho .............................. 345/173 |

* cited by examiner

DISAMBIGUATING TOUCH-INPUT BASED ON VARIATION IN CHARACTERISTIC SUCH AS SPEED OR PRESSURE ALONG A TOUCH-TRAIL

BACKGROUND

Unless otherwise indicated herein, the materials described in this section are not prior art to the claims and are not admitted to be prior art by inclusion in this section.

One of the most significant advances in the computing field in recent years has been the advent and widespread deployment of touch-sensitive input technology. Such technology is now commonly used to facilitate user input in countless devices and systems, such as mobile phones, tablet computers, gaming systems, home theater systems, vehicle dashboards, and customer kiosks for instance.

Two of the more typical implementations of touch-sensitive input technology are touch screens and touch pads. In general, a touch screen integrates a touch-sensitive input surface with a display screen, so that a user can touch and interact directly with displayed indicia in much the same way that a user would touch and interact with real-world objects such as buttons or the like. A touch pad, on the other hand, typically exists separately from but in association with a display screen, and typically functions to allow touch interaction as a replacement for a mouse or other cursor control device for instance.

In practice, a touch-sensitive input surface may employ any of a variety of mechanisms to sense touch and provide a corresponding output, so that a computing system can then take action in response to the detected touch. Examples of such mechanisms include, without limitation resistive sensors, capacitive sensors, and surface acoustic wave sensors.

SUMMARY

Disclosed herein are methods and corresponding devices and systems for processing input at a touch-sensitive input surface such as a touch screen or a touch pad. The disclosure addresses a problem that can occur where a user attempts to touch a particular point on an input surface but the user's touch ends up being more of a trail, either moving away from the intended touch point (e.g., slipping after touching the correct point) or moving toward the intended touch-point (e.g., correcting an erroneous landing on the touch screen).

According to an example method, a computing system will determine one or more characteristics of a touch-point trail and will use the determined characteristic(s) as a basis to determine the actually intended touch point, such as the landing point (where the trail began) or the lifting point (where the trail ended), so that the computing system can then take action based on that touch point.

In practice, the computing system may use one or more of the determined characteristic(s) as a basis to distinguish between at least (i) a slip and (ii) a corrective, and to take action accordingly. For instance, if the computing system determines that the trail is a slip, the computing system may use the landing point as the intended touch point. Whereas, if the computing system determines that the trail is a corrective, the computing system may use the lifting point as the intended touch point.

In one respect, for instance, the example method may involve detecting, by a computing system, a trail of touch input at a touch-sensitive input surface, the trail being defined by movement of the touch input from a landing position (where a fingertip, stylus, or other instrument landed on the touch-sensitive input surface) to a lifting position (where the fingertip, stylus, or other instrument then lifted from the touch-sensitive input surface). Further, the method may involve detecting, by the computing system, a variation in at least one of (i) speed of the movement of the touch input along the detected trail and (ii) pressure of the touch input along the detected trail. The method may then further involve determining, by the computing system, a particular input-position represented by the detected trail, where the determining function is based at least in part on the detected variation in speed and/or movement along the detected trail. Further, the input-position may be the landing position or the lifting position. And in turn, the method may then involve generating, by the computing system, an output signal based at least in part on the determined input-position of the detected trail.

In another respect, disclosed is a non-transitory machine-readable medium having stored thereon instructions executable by a processor to carry out various functions. For instance, the functions may include receiving data representing user input at a touch-sensitive input surface, the user input defining a touch-point trail having a length extending from a landing point to a lifting point. Further, the functions may include determining an input-point represented by the touch-point trail, where the determining function is based at least in part on a variation in at least one of (i) speed of movement of the user input along the length of the touch-point trail and (ii) pressure of the user input along the length of the touch-point trail. And still further, the functions may include providing output data representing the determined input-point.

And in yet another respect, disclosed is a computing system that includes an input device having a touch-sensitive input surface, a processor, a memory, and code comprising instructions stored at the memory and executable by the processor to carry out various functions. For instance, the functions may include detecting a touch trail at the touch-sensitive input surface, the touch trail being defined by touch input moving from a landing position to a lifting position. And the functions may include detecting a variation in at least one of (i) speed of movement of the touch input along touch trail and (ii) pressure of the touch input along the touch trail. The functions may then include determining whether an input-position of the touch trail is the landing position or is rather the lifting position, where the determining function is based at least in part on the detected variation. And the functions may include outputting data representing the determined input-position.

These, as well as other aspects, advantages, and alternatives will become more apparent to those of ordinary skill in the art by reading the following detailed description, with reference where appropriate to the accompanying drawings. Further, it should be understood that the description provided in this summary section and elsewhere in this document is intended to serve as an example only.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

As noted above, a touch-sensitive input surface can take various forms and can be used in various contexts and for various purposes. For instance, as noted above, the touch-sensitive input surface may take the form of a touch screen or a touch pad and may be integrated with any of a variety of devices or systems. The particular context and application for the touch-sensitive input surface should not be viewed as limiting, as the present disclosure relates generally to disambiguating touch-input provided at any touch-sensitive input surface.

In general, a touch-sensitive input surface is preferably arranged to provide an output that indicates the position of touch on the surface, so that an associated computing system can determine the position of touch and take responsive action such as registering a key press, activating a hyperlink, or activating an application or other logic. In practice, for instance, the touch-sensitive input surface may be arranged to sense touch in Cartesian coordinate grid system with granularity defined by the surface technology, and to provide an output specifying or indicating the coordinates where the touch occurred. An associated computing system may then receive that output and map the coordinates to currently displayed content or other information so as to facilitate determining an action to take in response to the touch that occurred at that location on the surface.

A user may touch the touch-sensitive input surface with a finger, stylus, or other instrument compatible with the touch-sensitive input surface. When a blunt instrument such as a finger is used to touch the surface, the touch may define a touch area rather than a touch point. In that case, the touch-sensitive input-surface may output an array of coordinates defining the touch area, and the computing system may treat the touch as occurring at that area generally or at a representative point such as a centroid of that area for instance. On the other hand, when a more narrow instrument such as a stylus is used to touch the surface, the output may indicate a specific point touched.

In practice, if a user intends to touch a particular point on the touch-sensitive input surface and the user touches that point and lifts up from the same point, the determination of the touch coordinates is straightforward. However, if the user touches the intended point and the user's touch then slips on the surface from that point before lifting, the determination of the touch coordinates is more complicated. Likewise, if the user touches a point slightly off from that intended and then moves the touch to the intended point before lifting, the determination of the touch coordinates is also more complicated. The present disclosure addresses issues such as these.

In particular, the present disclosure provides for detecting a trail of touch at a touch-sensitive input surface and automatically evaluating one or more characteristics of the trail as a basis to determine an intended touch-position represented by the trail. In practice, if the trail is a result of the touch slipping from the intended position (a slip), then the determined touch-position would be the landing position. Whereas, if the trail is a result of the touch moving from an incorrect landing position to the intended position (a corrective), then the determined touch-position would be the lifting position.

Figure 1:
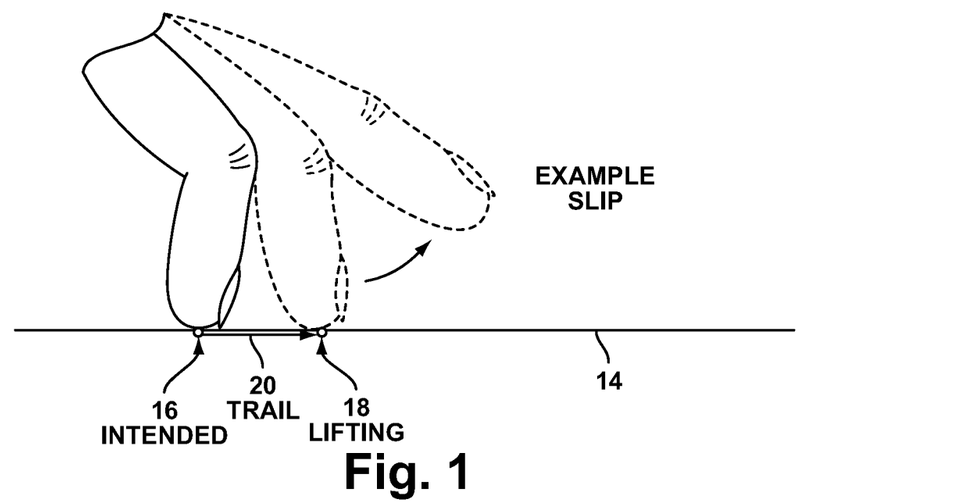
FIG. 1 is a depiction of an example touch-trail defining a slip.
Figure 2:
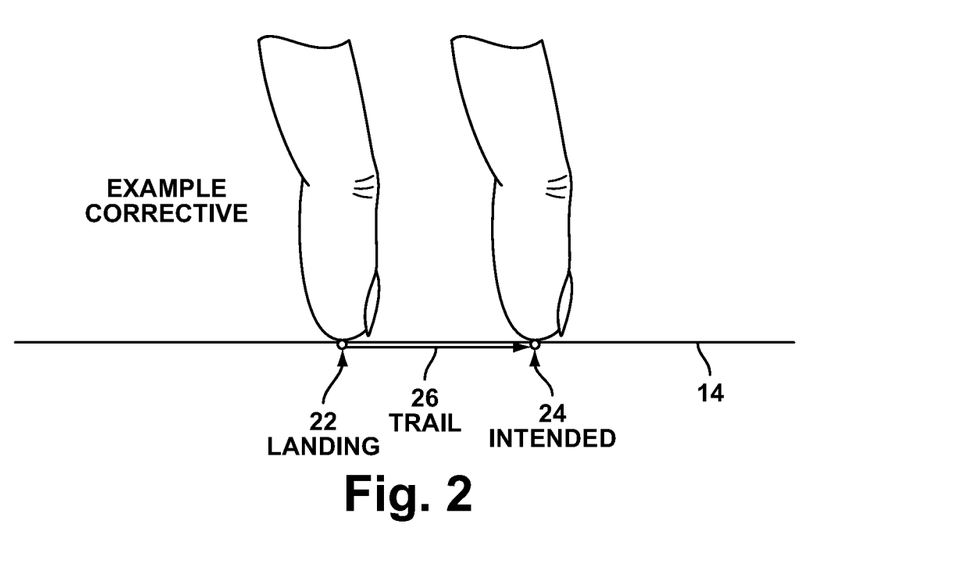
FIG. 2 is a depiction of an example touch-trail defining a corrective.

FIGS. 1 and 2 illustrate, respectively, examples of a slip and a corrective when a finger 12 is used to touch a touch-sensitive input surface 14.

In FIG. 1, a tip of the finger touches an intended position 16 on surface. After touching the intended position 16, the user may then remove the fingertip from the surface by flicking the finger upward. But in doing so as shown, the user's fingertip may slide along the surface and lift from the surface at a lifting position 18. As a result, a touch trail 20 would occur from the intended position 16 to the lifting position, thereby defining a slip, which is an unintentional trail from the intended touch position.

In FIG. 2, on the other hand, the user's fingertip lands on the surface at a landing position 22 that is not quite the intended touch position 24. Upon landing at the wrong position, the user may then intentionally slide the fingertip along the surface to the intended position 24. As a result, a touch trail 26 would occur from the landing position 22 to the intended position 24, thereby defining a corrective, which is an intentional trail to the intended touch position.

There may also be situations where a trail may include both a corrective and a slip. For instance, after a touch lands on the incorrect position, the user may move the touch along the surface to the intended position (as in FIG. 1), and the user's touch may then slip to another position before lifting from the surface (as in FIG. 2). In that case, the determined touch-position may be the position where the corrective ends and where the slip begins.

In practice, the determined touch-position may be a touch point having particular coordinates on the touch-sensitive input surface or may be a touch-area having an array of coordinates and/or a representative point (such as a centroid). Or the determined touch-position may take still other forms.

Figure 3:
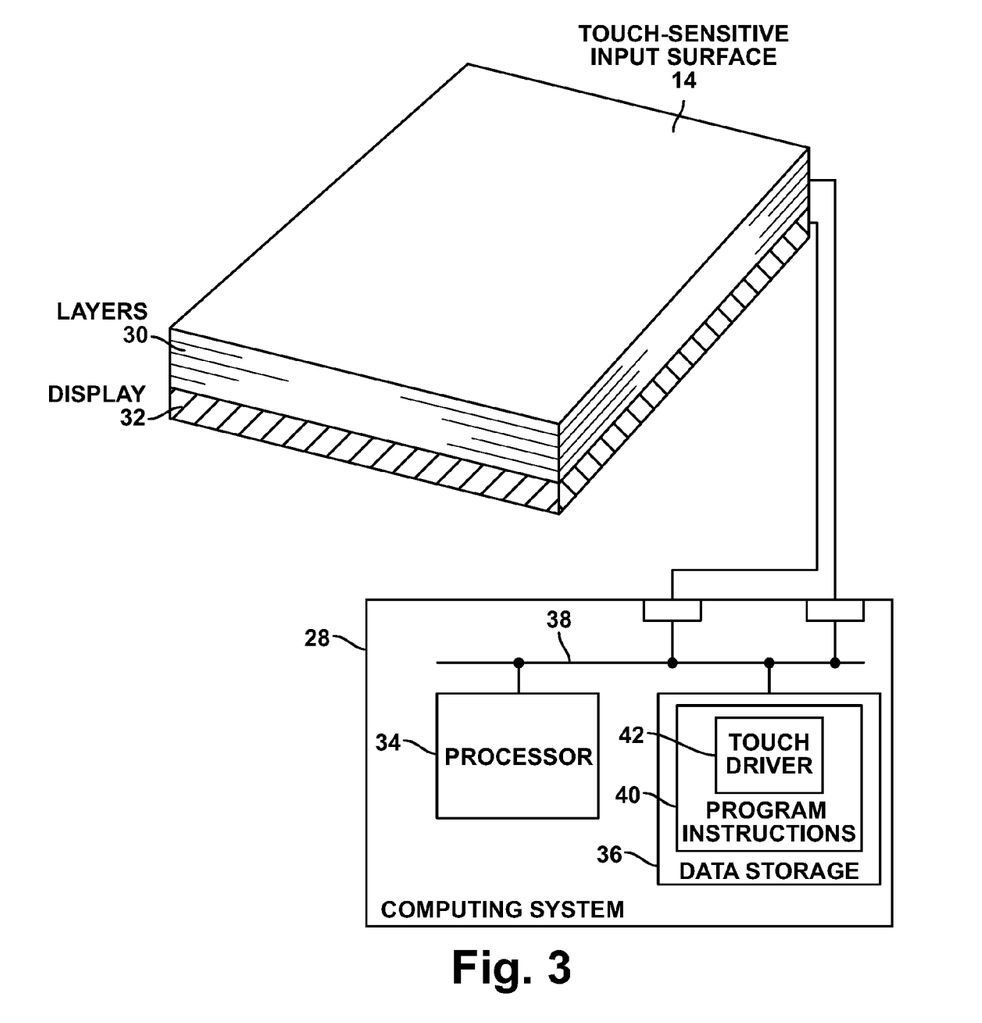
FIG. 3 is a depiction of an example touch-sensitive input surface coupled with or integrated with a computing system.

FIG. 3 next depicts a representative touch-sensitive input surface 14 coupled with or integrated with a computing system 28. In the arrangement shown, the touch-sensitive input surface includes a number of layers 30 disposed over a flat panel display 32 such as LCD or LED display for instance, thereby establishing a touch screen. In an alternative arrangement, as noted above, the touch-sensitive input surface could be provided separately from the display 32, as a touch pad for instance.

The touch-sensitive input surface layers 30 may be structured in any of a variety of ways to sense touch and to provide corresponding output to the computing system 28. For example, the layers may include a transparent protective layer overlaying a number of transparent layers that define current driving lines and current sensing lines, with the current sensing lines detecting touch at one or more nodes and providing corresponding output signals. As another example, the layers may include a transparent protective layer overlaying a transparent electrode layer that, with individual electrodes and capacitive sensing circuitry detecting touch at particular positions and providing corresponding output signals. And as still another example, the layers may include acoustic transducers at the edges of the surface, for detecting waves refracted as a result of touching at various positions on the surface, and providing corresponding output signals. Numerous other examples are possible as well and still others are bound to be developed in the future.

Furthermore, in addition to sensing position of touch, the touch-sensitive input surface may be arranged to sense the extent of pressure of touch. For example, the touch-sensitive input surface may include conductive particles that cause resistance to change in proportion to the extent of pressure, so as to facilitate providing an output that indicates the extent of touch pressure. As another example, the touch-sensitive input surface may use force-sensing resistors and piezoelectric actuators to detect the extent of pressure, so as to provide an output that likewise indicates the extent of touch pressure. Other examples may be possible as well.

In practice, as touch occurs at a single position on the touch-sensitive input surface, the surface may provide output that indicates (e.g., specifies) the coordinates where the touch occurred and perhaps the extent of pressure of the touch at that position, so that the computing system 28 can take action based at least in part on the position touched and perhaps based on the pressure of the touch. Likewise, as a touch trail occurs on the touch-sensitive input surface, the surface may provide output that indicates the coordinates of each of a sequence of touch positions along the trail from the start of the trail to the end of the trail, and perhaps for each touch position the extent of pressure of the touch at that position, so that the computing system 28 can take action based at least in part on the trail and perhaps based on the pressure of touch along the trail.

As shown in FIG. 3, a representative computing system 28 (such as one of the systems noted in the background section above, or any other computing system) includes a processor 34 and memory 36, coupled with a bus or other mechanism 38 that provides connectivity with the touch-sensitive input surface 14 and with the display 32. Although the touch-sensitive input surface 14 and computing system 28 are shown separately in the figure, they could be integrated together or provided in some other arrangement. For instance, the computing system may be provided as part of a touch-screen, forming an integral device that can evaluate and report or otherwise respond to touch input. Or the computing system could be provided remotely from the touch-sensitive input surface and communicatively linked with the touch-sensitive input surface by a network or other connection mechanism.

In the example arrangement shown, processor 34 may comprise one or more general purpose processors (e.g., microprocessors) and/or one or more special purpose processors (e.g., application specific integrated circuits and/or digital signal processors). Memory 36 may then comprise one or more volatile and/or non-volatile storage components (non-transitory data storage), such as magnetic, optical, flash, or organic memory for instance, and may be integrated in whole or in part with processor 34. The computing system may take various other forms as well.

As shown, memory 36 may contain code comprising program instructions 40 executable by processor 20 to carry out various functions described herein. Alternatively, some or all of those functions could be carried out by any other form of logic, such as by hardware and/or firmware logic possibly encoded on a chipset integrated with the touch-sensitive input surface or other associated component.

By way of example, the program instructions may define a driver 42 arranged to process output from the touch-sensitive input surface, so as to enable the computing system to take appropriate action.

In practice, for instance, as a touch occurs at a particular position on the touch-sensitive input surface 14 and the touch-sensitive input surface provides output indicating the touch coordinates, the driver may receive that output or a corresponding signal, and the driver may process the output. For example, the driver may map the indicated touch coordinates to content currently being presented at display 32, so that the computing system can take action based at least in part on touching of or associated with that particular content. Alternatively, the driver may in some other way process the output from the touch-sensitive input surface and provide resulting driver output, or may simply pass through for further processing by the computing system the output received from the touch-sensitive input surface.

Furthermore, as a touch occurs at a sequence of positions defining a trail on the touch-sensitive input surface 14 and the touch-sensitive input surface provides output indicating the sequence of coordinates defining the trail such as output that specifies continuously changing coordinates over time, and perhaps indicating touch pressure at each touch-position along the trail, the driver may receive that output or a corresponding signal and may process that output as well. In particular, according to the present disclosure, the driver may evaluate the trail to determine an intended input-position as a touch-position represented by the trail, so that the computing system can then take action based at least in part on that determined touch-position.

As noted above, the driver can determine the touch-position represented by the trail by determining and evaluating one or more characteristics of the detected trail. By way of example, the driver can detect a variation in speed of movement and/or pressure of the touch along the trail and can use that detected variation as a basis to determine a touch-position represented by the trail.

For instance, if the driver detects that the speed of movement of the touch increases as the touch approaches the end of the trail (e.g., the lifting position), the driver may conclude that the start of the trail (e.g., the landing position) is the relevant touch-position, since an increase in speed of movement may reflect a slip from the intended position. On the other hand, if the driver detects that the speed of movement of the touch decreases approaching the end of the trail, the driver may conclude that the end of the trail is the relevant touch-position, since the decrease in speed of movement may reflect a corrective movement to an intended position.

Likewise, if the driver detects that the pressure of touch decreases approaching the end of the trail, the driver may conclude that the start of the trail is the relevant touch-position, since the decrease in pressure may reflect movement away from the intended position. Whereas, if the driver detects that the pressure of touch increases approaching the end of the trail, the driver may conclude that the end of the trail is the relevant touch-position, since the increase in pressure may reflect movement to an intended position.

To facilitate detecting variation in speed of movement of touch along the trail, the driver may take sample coordinates of the trail with a constant time interval between samples, and the driver may compute the distance traveled along the surface between successive samples. For instance, as the trail is created by touch moving from one position to another, the driver may receive touch position coordinates from the touch-sensitive input surface at a constant time interval, and the driver may compute the distance between successive touch points. Alternatively, the driver may record time of receipt of each new touch position reported by the touch-sensitive input surface so as to programmatically plot position versus time for the trail, and the driver may sample position on that plot at a constant time interval and determine distance traveled between successive samples. Given the constant time interval between samples, a reduction in distance between the sample touch positions along the trail would represent a decrease in speed of movement of touch along the trail, whereas an increase in distance between the sample touch positions along the trail would represent an increase in speed of movement of touch along the trail.

To facilitate detecting variation in pressure of touch along the trail, the driver may evaluate touch-pressure values provided by the touch-sensitive input surface as discussed above for instance, to determine if the pressure increased as touch approached the end of the trail or if pressure decreased as touch approached the end of the trail for example. Alternatively or additionally, the driver may determine pressure of touch along the trail by evaluating one or more other characteristics of touch along the trail. For instance, if touch is by a fingertip or other malleable instrument, the driver may evaluate the surface area covered by touch at various positions along the trail and may correlate the covered surface area with an extent of pressure. The theory here is that touch of a malleable instrument with greater pressure would likely cover a greater surface area, whereas touch of a malleable instrument with less pressure would likely cover less surface area. If the touch-sensitive input surface reports an array of points or other indication of touch area along the trail, the driver may thus compute surface area covered by that touch area along the trail as a surrogate indication of pressure. An increase of touch area along the trail would represent an increase in pressure along the trail, whereas a decrease in touch area along the trail would represent a decrease in pressure along the trail.

Figure 4:
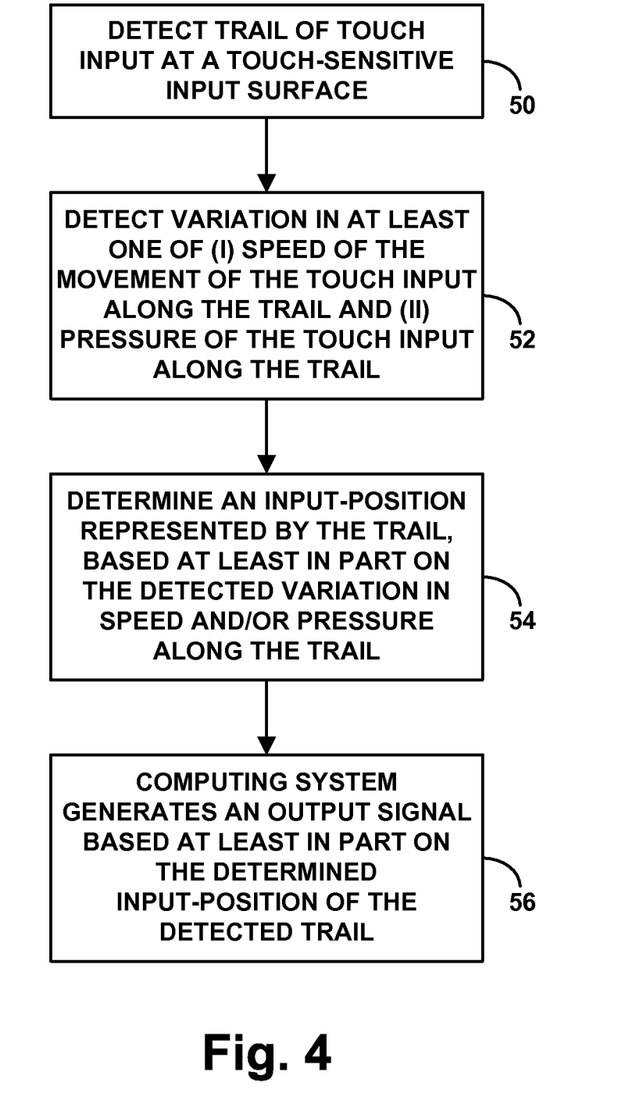
FIG. 4 is a flow chart depicting functions that can be carried out according to an example method.

Referring next to FIG. 4, a flow chart is provided to illustrate functions that can be carried out in accordance with an example method. These functions can be carried out by a computing system such as that shown in FIG. 3 and described above for instance, and/or by one or more other machines. Further, these functions can be encoded on a non-transitory machine readable medium (such as data storage 36, or any other removable or non-removable non-transitory medium) and executable by a processor (such as processor 34).

As shown in FIG. 4, at block 50, the method includes detecting a trail of touch input at a touch-sensitive input surface, the trail being defined by movement of the touch input from a landing position to a lifting position. At block 52, the method then further involves detecting a variation in at least one of (i) speed of the movement of the touch input along the detected trail and (ii) pressure of the touch input along the detected trail. Although blocks 50 and 52 are shown in sequential order in the figure, the example method may just as well involve carrying out the functions of those blocks concurrently. For instance, as the computing system receives output from the touch-sensitive input surface 14 reporting touch positions defining a trail, and perhaps pressure of touch at each position, the computing system may detect that the sequence of touch positions defines a trail of touch at the surface, and the computing system may concurrently detect a variation in speed of movement of the touch along the trail and/or a variation in pressure of the touch along the trail.

At block 54, the method further involves determining an input-position represented by the detected trail, based at least in part on the detected variation in speed and/or pressure along the trail. As noted above, for instance, based on the detected variation, the computing system may determine that the input-position represented by the detected trail is the landing position (e.g., in the case of a slip) or the lifting position (e.g., in the case of a corrective). Alternatively, in a scenario where the trail includes both a corrective and a slip, the computing system may determine that the input-position represented by the trail is a position where the corrective ends and the slip begins. Other examples are possible as well.

In line with the discussion above, for instance, the computing system may detect a variation in speed of the movement of the touch input (i.e., touch) along the detected trail and may determine the relevant input-position based at least in part on that detected variation in speed. For example, the detected variation in speed may be an increase of speed approaching the lifting position (e.g., an increase in speed as the touch moves away from the landing position), in response to which the computing system may conclude that the input-position is the landing position. Or the detected variation in speed may be a decrease in speed approaching the lifting position (e.g., a decrease in speed as the touch moves away from the landing position), in response to which the computing system may conclude that the input-position is the lifting position.

Alternatively or additionally, the computing system may detect a variation in pressure of the touch input along the detected trail and may determine the relevant input-position based at least in part on that detected variation in pressure. For example, the detected variation in pressure may be an increase in pressure approaching the lifting position (e.g., an increase in pressure as the touch moves away from the landing position), in response to which the computing system may conclude that the input-position is the lifting position. Or the detected variation in pressure may be a decrease in pressure approaching the lifting position (e.g., a decrease in pressure as the touch moves away from the landing position), in response to which the computing system may conclude that the input-position is the landing position.

Moreover, as further noted above, the computing system can evaluate surface area of touch along the trail as a surrogate indication of pressure of touch along the trail, as a basis to detect a variation in pressure of touch along the trail, and thus as a basis to determine the relevant input-position represented by the trail. For instance, the computing system may detect that the surface area of touch increases approaching the lifting position (e.g., increases as touch moves away from the landing position), in response to which the computing system may conclude that the input-position is the lifting position. Or the computing system may detect that the surface area of touch decreases approaching the lifting position (e.g., decreases as touch moves away from the landing position), in response to which the computing system may conclude that the input-position is the landing position.

Note also that the function at block 54 of determining the input-position can be carried out even before the computing system has detecting the full trail. For instance, if speed of movement of the touch increases substantially enough as the touch moves away from the landing position, the computing system may conclude that the landing position is the relevant input-position, without the need to wait for the trail to end. Likewise, if pressure of touch decreases substantially enough as the touch moves away from the landing position, the computing system may conclude that the landing position is the relevant input-position.

Furthermore, note that in some situations, a touch trail on a touch-sensitive input surface may be an intentional gesture or drag motion rather than a slip or corrective, in which case it may be unnecessary to determine just a particular input position represented by the trail. To account for this possibility, the computing system may programmatically determine whether the trail is likely a gesture or drag, and may condition performing the functions of FIG. 4 on first determining that the trail is not likely a gesture or drag.

In practice, the computing system may determine if a trail is a gesture or drag, rather than a corrective or slip, by evaluating the length of the trail, evaluating the shape of the trail, and/or evaluating content currently presented on the screen where the trail occurred. For example, if the trail length is greater than a predefined threshold length (such as the shortest length of a set of defined, allowable gestures), the driver may programmatically conclude that the trail may be a gesture. As another example, if the trail makes more than a threshold turn (rather than taking a straight or slightly curved path on the surface), the driver may programmatically determine that the trail may be a gesture. And as another example, if the trail extends from touching a position that corresponds with a draggable object currently presented at the display to another position (such as a logical destination position for the object), the driver may programmatically determine that the trail may be a drag.

Whether the computing system applies any of these and/or other criteria, the computing system may be arranged to perform this evaluation as a precursor or condition to the computing system then determining an input-position represented by the trail, and thus disambiguating between a corrective and a slip. That is, upon detecting a trail, the driver could first determine if the trail is a gesture or drag or is otherwise not a corrective or slip. If the driver determines that the trail is a gesture or drag or is otherwise not a corrective or slip, then the driver may forgo disambiguating between a corrective and a slip. Whereas, if the driver determines that the trail is a corrective or slip or otherwise not a gesture or drag, then the driver may carry out the present method to disambiguate between a corrective and a slip or more particularly to determine an input-position represented by the trail, so as to enable the computing system to take action based at least in part on that determined input-position.

Continuing with reference to FIG. 4, at block 56, the computing system may then generate an output signal based at least in part on the determined input-position of the detected trail. The output signal can take various forms and can serve various purposes, either internally in the computing system or outside the computing system. For instance, the output signal can include data specifying information to display, application logic to invoke, or the like, or the output signal can more simply identify the determined input-position or can take some other form.

In practice, the output signal can trigger a change in operational state of the computing system, such as (without limitation) invocation of an application or other logic, or changing of graphical information that the computing system presents at display 32. For instance, based at least in part on the determined input-position, the computing system may display particular graphical information, such as information corresponding with the input-position. As a specific example, in a situation where the touch-sensitive input surface is integrated with a display that displays a virtual keyboard including a plurality of virtual keys (i.e., displayed keys), if the determined input-position is at a position where a particular one of the virtual keys is displayed and thus corresponds with that virtual key, and if that virtual key is associated with a particular character (e.g., depicts the particular character and/or when engaged would cause the particular character to be displayed or entered), the computing system may display that character in a text entry field at the display 32. Likewise, even if the touch-sensitive input surface is separate from a display screen 32, the computing system may respond to the determined input-position by displaying graphical information based at least in part on the determined input-position, possibly also based on a correlation with currently displayed content.

Figure 5:
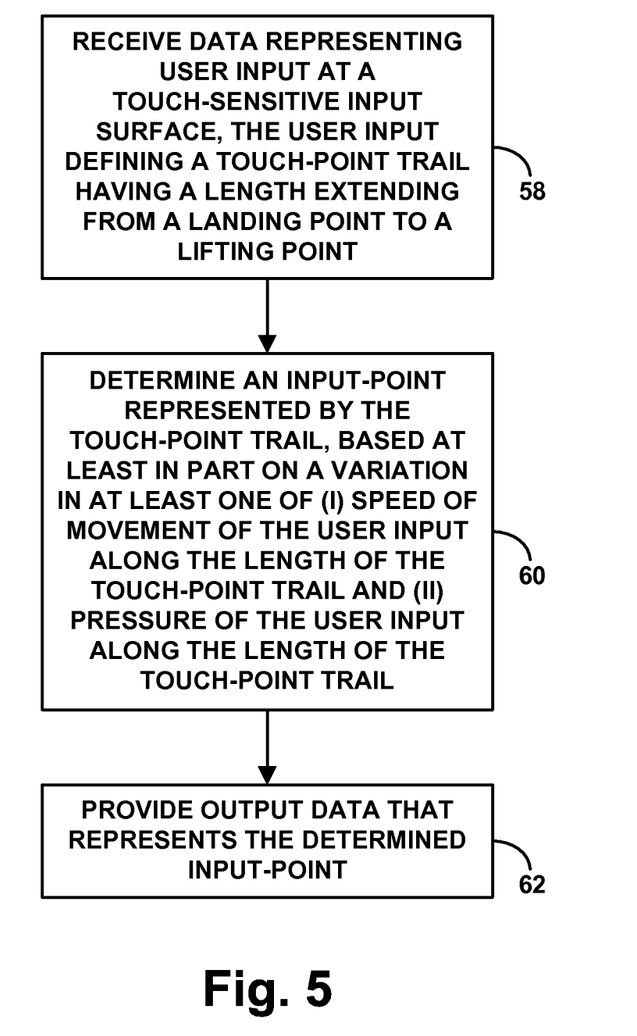
FIG. 5 is another flow chart depicting functions that can be carried out according to an example method.

FIG. 5 is next another flow chart depicting functions that can be carried out in accordance with an example method. These functions as well can be carried out by a computing system such as that shown in FIG. 3 and described above, and/or by one or more other machines. Further, these functions as well can be encoded on a non-transitory machine readable medium (such as data storage 36, or any other removable or non-removable non-transitory medium) and executable by a processor (such as processor 34).

As shown in FIG. 5, at block 58, the functions include receiving data representing user input at a touch-sensitive input surface, the user input defining a touch-point trail having a length extending from a landing point to a lifting point. As discussed above, by way of example, this can be done by receiving output from the touch-sensitive input surface, indicating a sequence of touch-points that cooperatively define a touch-point trail. For instance, the output from the touch-sensitive input surface may define a sequence of touch positions each defining a touch area covering an group of points, and the computing system may evaluate each such touch position to determine a representative touch point such as a centroid of the touch area. As the computing system receives a sequence of such touch positions each thus defining a touch-point, the computing system would thereby be receiving user input that defines a touch-point trail extending from a landing point to a lifting point. Alternatively, each touch-point could itself be a less granular touch-area.

At block 60, which may be carried out in parallel with the block 58, the functions further include determining an input-point represented by the touch-point trail, based at least in part on a variation in at least one of (i) speed of movement of the user input along the length of the touch-point trail and (ii) pressure of the user input along the length of the touch-point trail. This function can be carried out largely as described above for instance.

In turn, at block 62, the functions include providing output data that represents the determined input-point. For instance, a program module (e.g., routine or function) that carries out the functions of blocks 58 and 60 may return to a calling module a data value specifying the determined input-point, so that the calling module or other logic can then take action based on the determined input-point. Alternatively or additionally, the computing system may otherwise output data representing the determined input-point, such as to provide data as discussed above or otherwise to other portions of the computing system or to one or more external devices, and perhaps to trigger a change in operational state of the computing system or other device based on the determined input-point.

As with the example method described above with respect to FIG. 4, the functions of FIG. 5 may additionally involve displaying graphical information based at least in part on the determined input-point. For instance, the computing system may present or cause to be presented at display 32 a character associated with a virtual key located at the determined input-point.

Figure 6:
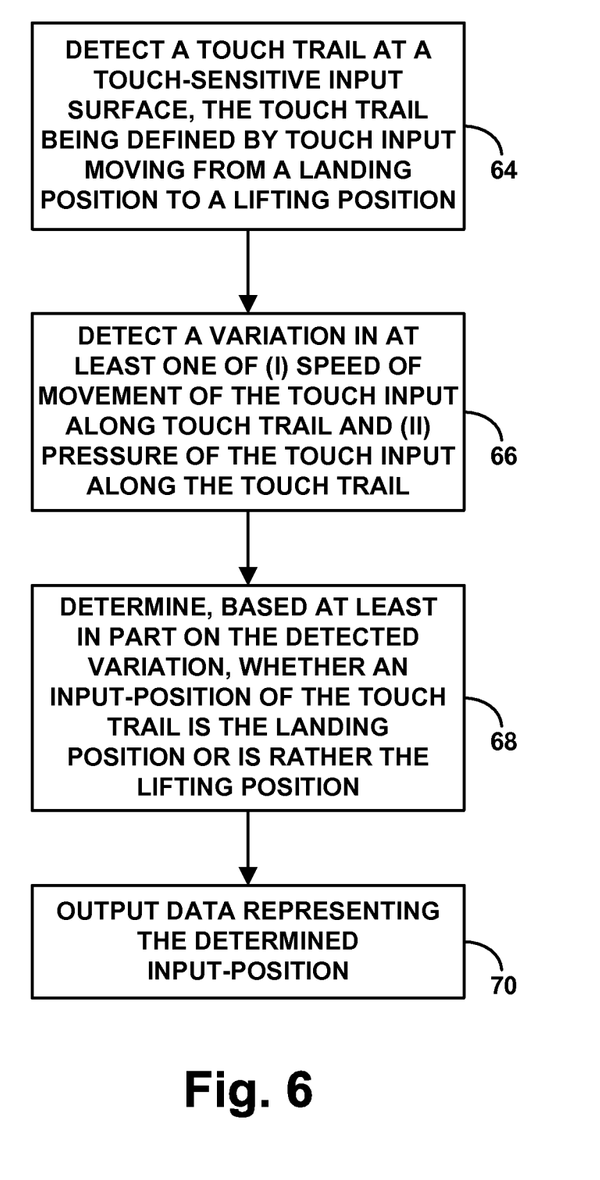
FIG. 6 is another flow chart depicting functions that can be carried out according to an example method.

FIG. 6 is yet another flow chart depicting functions that can be carried out in accordance with an example method. In practice, these functions can similarly be carried out by a computing system that generally includes an input device (such as a touch-screen or touch pad) having a touch-sensitive input surface, a processor, data storage, and input-position determination logic stored in the data storage and executable by the processor to carry out the functions.

As shown in the figure, at block 64, the functions include detecting a touch trail at the touch-sensitive input surface, the touch trail being defined by touch input moving from a landing position to a lifting position. At block 66, which may occur in parallel with block 64, the functions further include detecting a variation in at least one of (i) speed of movement of the touch input along touch trail and (ii) pressure of the touch input along the touch trail. At block 68, the functions then include determining, based at least in part on the detected variation, whether an input-position of the touch trail is the landing position or is rather the lifting position, in the manner described above for instance. And at block 70, the functions include outputting data representing the determined input-position. These functions can be carried in largely in the manner discussed above for instance.

In practice, the computing system that carries out the functions of FIG. 6 may also include in its data storage response logic that is executable by the processor to change a state of the computing system based at least in part on the data output by the input-position determination logic. For instance, the computing system may map the indicated input-position to content currently displayed at display 32 in order to determine an object or other virtual display content that the user touched, and the computing system may change the state of the computing system in response to the user having touched that virtual display content. By way of example, the computing system may change the display presentation to display different content, or the computing system may carry out any of a variety of other functions. Upon changing display content or carrying out another functions, the computing system would have a new state in which the display content is changed or the other function is being carried out. Other examples are possible as well.

Figure 7:
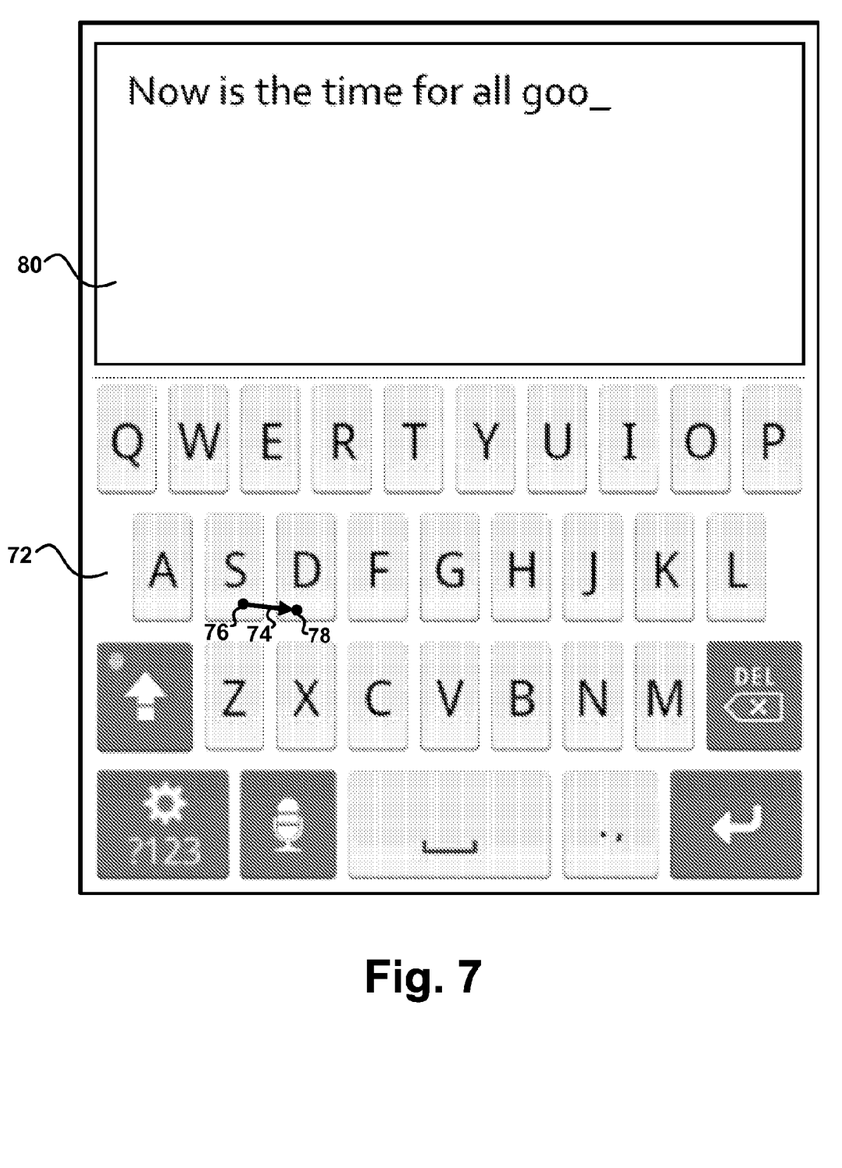
FIG. 7 depicts an example display on a touch-sensitive input surface.

Finally, referring to FIG. 7, there is shown an example of content that may be presented on a touch screen, and an example of a touch trail that may occur from a landing point to a lifting point on the touch screen. In particular, FIG. 7 depicts at a bottom area of the touch screen a virtual keyboard 72, and a touch trail 74 extending from a landing point 76 at the right edge of the "s" key to a lifting point 78 at the left edge of the "d" key. Further, the figure depicts at the top of the touch screen a text entry field 80 displaying characters that a user has typed so far on the virtual keyboard.

When a computing system detects a touch trail such as this, at issue for the system may be whether the intended touch point is over the "s" key or over the "d" key, and thus whether the system should display in the text entry field 80 as a next typed character an "s" or a "d".

Applying an example of the present method, the computing system may make this determination by evaluating a variation in speed of movement of touch along the trail 74 from the landing point 72 to the lifting point 76, and/or a variation in pressure of touch along the trail from the landing point to the lifting point.

If the computing system determines that the touch movement speeds up approaching the lifting point and/or that the pressure of touch decreases approaches the lifting point, then the computing system may determine that the intended touch point is over the "s", at the landing point, as the increase in speed or decrease in pressure may represent a slip from the intended point. Whereas, if the computing system determines that the touch slows down approaching the lifting point and/or that the pressure of touch increases approaches the lifting point, then the computing system may determine that the intended touch point is over the "d", at the lifting point, as the decrease in speed or increase in pressure may represent a corrective move to the intended point. Based on this determination, the computing system may then display either an "s" or a "d" as the next character in the text entry field 80.

It may also be possible in the embodiments described above or in other embodiments for the computing system to dynamically develop and apply various threshold characteristics, regarding speed and pressure for instance, as a basis to determine whether a touch trail is a slip or a corrective. In practice, for instance, there may be characteristic variations in speed and/or variation in pressure for slips and correctives by a particular user or on a particular device, and the computing system may identify these characteristic variations by observing success or failure of touch point determinations over time.

For example, in many cases when a user's touch slips after touching an intended point, the speed of movement of touch may accelerate in a particular manner (at a particular rate for instance), possibly due to way the user's finger or stylus was being applied. Likewise, in many cases when the user corrects a touch after landing on the wrong point, the speed of movement of the touch may decelerate in a particular manner approaching the intended point, with the manner again possibly being due to the way the user's finger or stylus was being applied. Similar characteristic variations in pressure or other metrics may exist as well.

In practice, when the computing system is faced with a touch trail and the need to decide whether the landing point or lifting point should be treated as the intended touch point, the computing system may make a decision (in the manner discussed above for example) and take action in response.

For instance, with the example shown in FIG. 7, the computing system may decide that the user touched the "s" key, and the computer may display the letter "s" in the text entry field. If the user agrees with that result and does not correct the result (e.g., the user does not change the "s" to a "d"), the computing system may record the variation in speed and/or pressure associated with the trail 74 and note that that recorded variation in speed and/or pressure was indicative of the landing point being the intended touch point. Considering such a record or perhaps multiple such records statistically combined over time, the computing system may then make a more educated decision to use the landing point as the intended touch point when later faced with a trail having a similar variation in speed and/or pressure.

On the other hand, if the user corrects the decision of the computing system, such as by changing the "s" to a "d", the computing system may record the variation in speed and/or pressure associated with the trail 74 and note that that recorded variation in speed and/or pressure was not indicative of the landing point being the intended touch point, or the computing system may simply not record that variation as being indicative of anything for instance.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the claims.

We claim:

1. A non-transitory machine-readable medium having stored thereon instructions executable by a processor to carry out functions comprising:

receiving data representing user input at a touch-sensitive input surface, the user input defining a touch-point trail having a length extending from a landing point to a lifting point;

determining whether an input-point represented by the touch-point trail is the landing point or is rather the lifting point, wherein the determining is based at least in part on a variation in speed of movement of the user input along the length of the touch-point trail, wherein determining whether the input-point is the landing point or is rather the lifting point comprises (i) determining that the input-point is the landing point if speed of movement of the user input along the length of the touch-point trail increases approaching the lifting point, and (ii) determining that the input-point is the lifting point if speed of movement of the user input along the length of the touch-point trail decreases approaching the lifting point; and providing output data representing the determined input-point.

2. The non-transitory machine-readable medium of claim 1, wherein the functions further comprise:

displaying graphical information based at least in part on the determined input-point.

3. The non-transitory machine-readable medium of claim 2, wherein the touch-sensitive input surface displays a virtual keyboard including a plurality of virtual keys, the input-point corresponds with a particular virtual key from the plurality of virtual keys, the particular virtual key is associated with a character, and the graphical information comprises the character.

4. The non-transitory machine-readable medium of claim 2, wherein the touch-sensitive input surface is embodied in a touch-screen, and wherein displaying the graphical information comprises displaying the graphical information on the touch-screen.

5. The non-transitory machine-readable medium of claim 2, wherein the touch-sensitive input surface is embodied in a touch-pad separate from a display screen, and wherein displaying the graphical information comprises displaying the graphical information at the display screen.

6. A non-transitory machine-readable medium having stored thereon instructions executable by a processor to carry out functions comprising:

receiving data representing user input at a touch-sensitive input surface, the user input defining a touch-point trail having a length extending from a landing point to a lifting point;

determining whether an input-point represented by the touch-point trail is the landing point or is rather the lifting point, wherein the determining is based at least in part on a variation in pressure of the user input along the length of the touch-point trail, whether the input-point is the landing point or is rather the lifting point, wherein determining whether the input-point is the landing point or is rather the lifting point comprises (i) determining that the input-point is the landing point if pressure of the user input along the length of the touch-point trail increases approaching the lifting point, and (ii) determining that the input-point is the lifting point if pressure of the user input along the length of the touch-point trail decreases approaching the lifting point; and providing output data representing the determined input-point.

7. The non-transitory machine-readable medium of claim 6, wherein the functions further comprise:

displaying graphical information based at least in part on the determined input-point.

8. The non-transitory machine-readable medium of claim 7, wherein the touch-sensitive input surface displays a virtual keyboard including a plurality of virtual keys, the input-point corresponds with a particular virtual key from the plurality of virtual keys, the particular virtual key is associated with a character, and the graphical information comprises the character.

9. The non-transitory machine-readable medium of claim 7, wherein the touch-sensitive input surface is embodied in a touch-screen, and wherein displaying the graphical information comprises displaying the graphical information on the touch-screen.

10. The non-transitory machine-readable medium of claim 7, wherein the touch-sensitive input surface is embodied in a touch-pad separate from a display screen, and wherein displaying the graphical information comprises displaying the graphical information at the display screen.

11. A non-transitory machine-readable medium having stored thereon instructions executable by a processor to carry out functions comprising:

receiving data representing user input at a touch-sensitive input surface, the user input defining a touch-point trail having a length extending from a landing point to a lifting point;

determining whether an input-point represented by the touch-point trail is the landing point or is rather the lifting point, wherein the determining is based at least in part on a variation in pressure of the user input along the length of the touch-point trail, whether the input-point is the landing point or is rather the lifting point, wherein determining, based at least in part on the variation in pressure of the user input along the length of the touch-point trail, whether the input-point is the landing point or is rather the lifting point comprises determining, based at least in part on variation in touch-area of the user input along the length of the touch-point trail, whether the input-point is the landing point or is rather the lifting point, the touch-area corresponding with the pressure.

12. The non-transitory machine readable medium of claim 11, wherein determining, based at least in part on the variation in touch-area of the user input along the touch-point trail, whether the input-point is the landing point or is rather the lifting point comprises:

determining that the input-point is the lifting point if the touch-area of the user input along the length of the touch-point trail increases approaching the lifting point; and determining that the input-point is the landing point if pressure of the user input along the length of the touch-point trail decreases approaching the lifting point.

13. The non-transitory machine-readable medium of claim 11, wherein the functions further comprise:

displaying graphical information based at least in part on the determined input-point.

14. The non-transitory machine-readable medium of claim 13, wherein the touch-sensitive input surface displays a virtual keyboard including a plurality of virtual keys, the input-point corresponds with a particular virtual key from the plurality of virtual keys, the particular virtual key is associated with a character, and the graphical information comprises the character.

15. The non-transitory machine-readable medium of claim 13, wherein the touch-sensitive input surface is embodied in a touch-screen, and wherein displaying the graphical information comprises displaying the graphical information on the touch-screen.

16. The non-transitory machine-readable medium of claim 13, wherein the touch-sensitive input surface is embodied in a touch-pad separate from a display screen, and wherein displaying the graphical information comprises displaying the graphical information at the display screen.

17. A method comprising:
    detecting, by a computing system, a trail of touch input at a touch-sensitive input surface, the trail being defined by movement of the touch input from a landing position to a lifting position;
    detecting, by the computing system, a variation in pressure of the touch input along the detected trail, wherein detecting the variation in pressure of the touch input along the detected trail comprises detecting a corresponding variation in surface area of the touch input along the detected trail;
    determining, by the computing system, whether an input-position represented by the detected trail is the landing position or is rather the lifting position, wherein the determining is based at least in part on the detected variation in surface area of the touch input along the detected trail; and
    generating, by the computing system, an output signal based at least in part on the determined input-position of the detected trail.

18. The method of claim 17, wherein determining whether the input-position represented by the detected trail is the landing position or is rather the lifting position comprises:
    determining that the input-position is the lifting position if the variation in pressure comprises an increase in pressure approaching the lifting position; and
    determining that the input-position is the landing position if the variation in pressure comprises a decrease in pressure approaching the lifting position.

19. The method of claim 17, wherein determining whether the input-position is the landing position or is rather the lifting position comprises:
    determining that the input-position is the lifting position if the variation in surface area comprises an increase in surface area approaching the lifting position; and
    determining that the input-position is the landing position if the variation in surface area comprises a decrease in surface area approaching the lifting position.

20. The method of claim 17, further comprising conditioning performing the method on an initial determination that the trail does not indicate a gesture or a drag.

* * * * *